July 19, 1960

H. SCHOEPE ET AL 2,945,394

MACHINE TOOL

Filed July 22, 1957

INVENTORS
HARRY SCHOEPE
ROBERT C. EBERSOLD
BY Hudson, Boughton,
Williams, David & Hoffmann
ATTORNEYS

United States Patent Office 2,945,394
Patented July 19, 1960

2,945,394
MACHINE TOOL

Harry Schoepe, Seven Hills, and Robert C. Ebersold, Chagrin Falls, Ohio, assignors to The Warner & Swasey Company, Cleveland, Ohio, a corporation of Ohio Filed July 22, 1957, Ser. No. 673,465

16 Claims. (Cl. 74—472)

The present invention relates to a machine tool and, more particularly, to the drive mechanism for a machine tool element such as the cross slide of a turret lathe.

The principal object of the present invention is to provide a new and improved machine tool, particularly a turret lathe, in which the mechanism for driving a machine tool element, such as a cross slide, is flexible and compact and capable of operating satisfactorily under heavy loads.

Another object of the present invention is to provide a new and improved machine tool having a drive mechanism for a machine tool element thereof in which a drive shaft is selectively connectable to a power shaft by a first clutch mechanism and to the element by a second clutch mechanism, the clutch mechanisms including movable members for actuating the clutches between engaged and disengaged positions with the clutch members being actuatable by cams driven in timed relationship to the rotation of the drive shaft to provide an extremely flexible machine tool.

Another object of the present invention is to provide a new and improved machine tool having a drive for a machine tool element in which the movable member of the clutch mechanism for connecting the drive shaft for driving a machine tool element to a power shaft is actuated independently of the operation of control cam means rotated in timed relationship to the rotation of the drive shaft to initially effect engagement of the clutch mechanism and is subsequently disengaged to disconnect the power shaft from the machine tool element by the control cam means.

A further object of the present invention is to provide a new and improved machine tool wherein a reversible drive for a first machine tool element to be moved through a work stroke and for a second machine tool element whose work stroke is to be initiated and carried out in timed relationship to the work stroke of the first machine tool element includes a first clutch actuated in timed relationship to the movement of the first element to connect the second machine tool element to the drive to move the second machine tool element through its work stroke and a second clutch actuated to disengage the drive to the second element through the first clutch to provide a dwell at the end of the work stroke of the second machine tool element thereby enabling the drive to the first machine tool element to be continued without disengaging the first clutch and without moving the second element, the engagement and diseangagement of the second clutch and the disengagement of the first clutch being effected by control cams rotated in timed relation to the drive through the first clutch.

A still further object of the present invention is to provide a new and improved machine tool wherein a normally engaged clutch is actuated at the end of the work stroke of a machine tool element to provide a dwell in the movement of the machine tool element with respect to a drive to be operated during the dwell period to move a second machine tool element, the clutch preferably being actuated by the operation of a control cam rotated in timed relation to the drive both during the movement of the machine tool element and during the dwell period.

The present invention resides in certain constructions and combinations and arrangements of parts and further objects and advantages thereof will be apparent from the following detailed description of the preferred embodiment made with reference to the accompanying drawings forming a part of this specification for all matter shown therein, whether or not expressly described, and in which.

The present invention contemplates the provision in a machine tool of a new and improved drive mechanism for a machine tool element of the machine tool, which drive mechanism comprises a first clutch for connecting a drive shaft to the power shaft and a second clutch for connecting the drive shaft to the machine tool element, the clutches being operated by control cams driven in timed relationship to the rotation of the drive shaft. The invention also provides a clutch mechanism for interconnecting a driving member and a driven member which clutch mechanism includes a movable member shiftable to engage and disengage the clutch mechanism and actuated to a clutch-disengaged position by a cam rotated in timed relationship to the driven member and to a clutch-engaged position by means independent of the cam means.

While the present invention is susceptible of various constructions and of use in various types of machine tools, it is particularly useful when embodied in a drive for the cross slide of an automatic lathe.

Referring to the drawings, the present invention is shown as embodied in a single spindle automatic lathe of the type shown and described in Patent No. 2,644,222, issued to M. S. Curtis, et al. Since the machine may be the same as the machine shown and described in detail in the aforesaid patent, only those parts of the machine will be shown herein which are necessary for an understanding of the present invention and the relationship of the present invention to the machine as shown and described in the patent; and reference is hereby made to the aforesaid patent for those details of structure and operation which do not, in themselves, constitute a part of the present invention and which are not deemed necessary for an understanding of the present invention.

Figure 1:
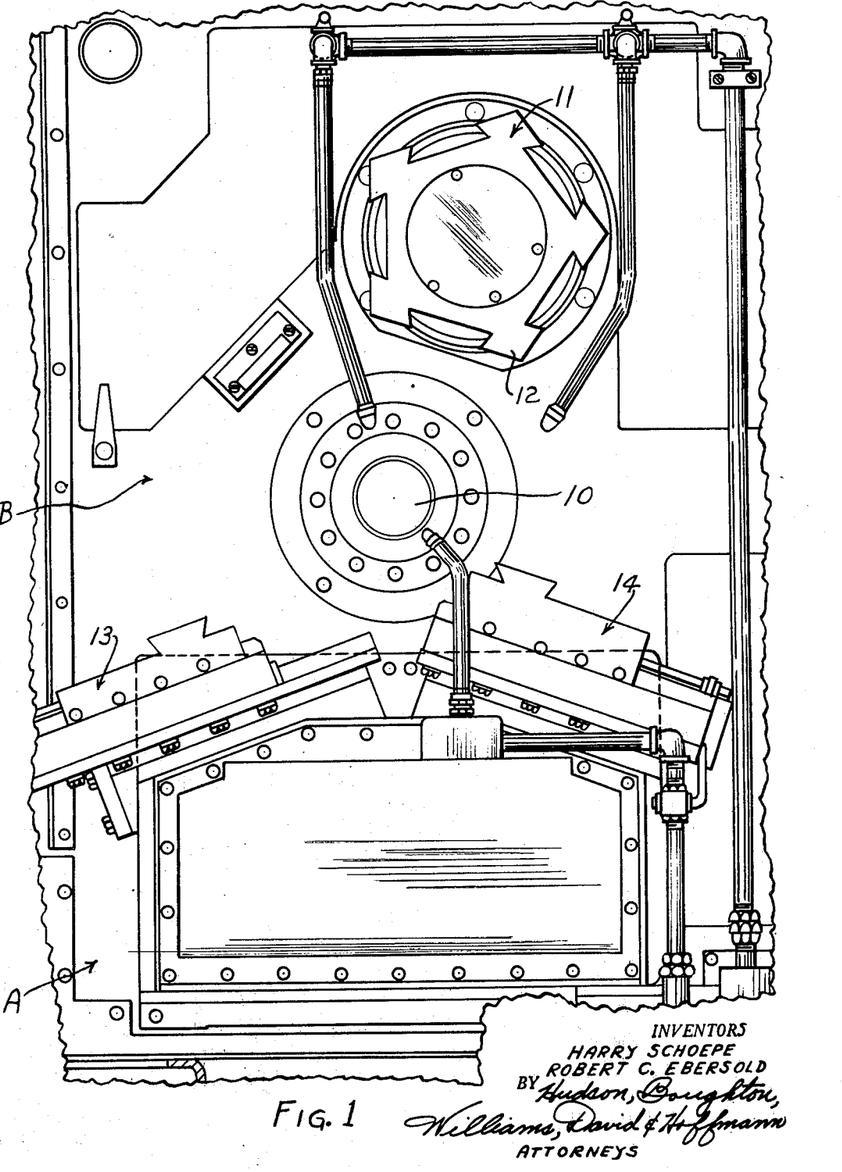
Fig. 1 is a fragmentary and elevational view of an automatic turret lathe embodying the present invention.

Referring to Fig. 1, the machine includes a rotatable spindle 10 supported for rotation about a horizontal axis by vertically extending frame and housing portions, the lower part of which may be termed a bed and is designated by the reference character A and the upper part of which may be termed a headstock and is designated by the reference character B. The headstock rotatably supports the spindle 10 and the spindle is provided at its outer end with a suitable chuck as is well understood in the art for supporting the work to be operated upon. It will be understood, however, that under certain circumstances the spindle 10 may be used as a tool spindle rather than a work supporting spindle and in that case the chuck would be adapted to support a tool.

The headstock B supports, in addition to the rotatable spindle 10, a carrier 11 which will be termed herein a tool carrier although it is to be understood that in some instances it may function as a work carrier. The carrier 11 is supported by the headstock for reciprocating movement parallel to the axis of the work spindle 10 and for indexing rotation. The carrier 11 has in the illustrated embodiment, a pentagon-shaped portion 12, each face of which is provided with means for adjustably mounting a tool thereon, the tools being indexible, by rotating the carrier 11, to a position to perform an operation on the work carried by the work spindle 10.

The bed A is provided with a front cross slide 13, the left-hand cross slide as viewed in Fig. 1, and a rear cross slide 14, the right-hand cross slide as viewed in Fig. 1, for supporting tools and for moving the tools into position to perform an operation on work carried by the spindle 10. The cross slides 13, 14 are disposed on opposite sides of and below the axis of the spindle 10 and are reciprocated in the illustrated machine to move tools thereon toward and away from the axis of the spindle 10 in timed relationship to the operation of the machine and the movement of the carrier 11.

Figure 2:
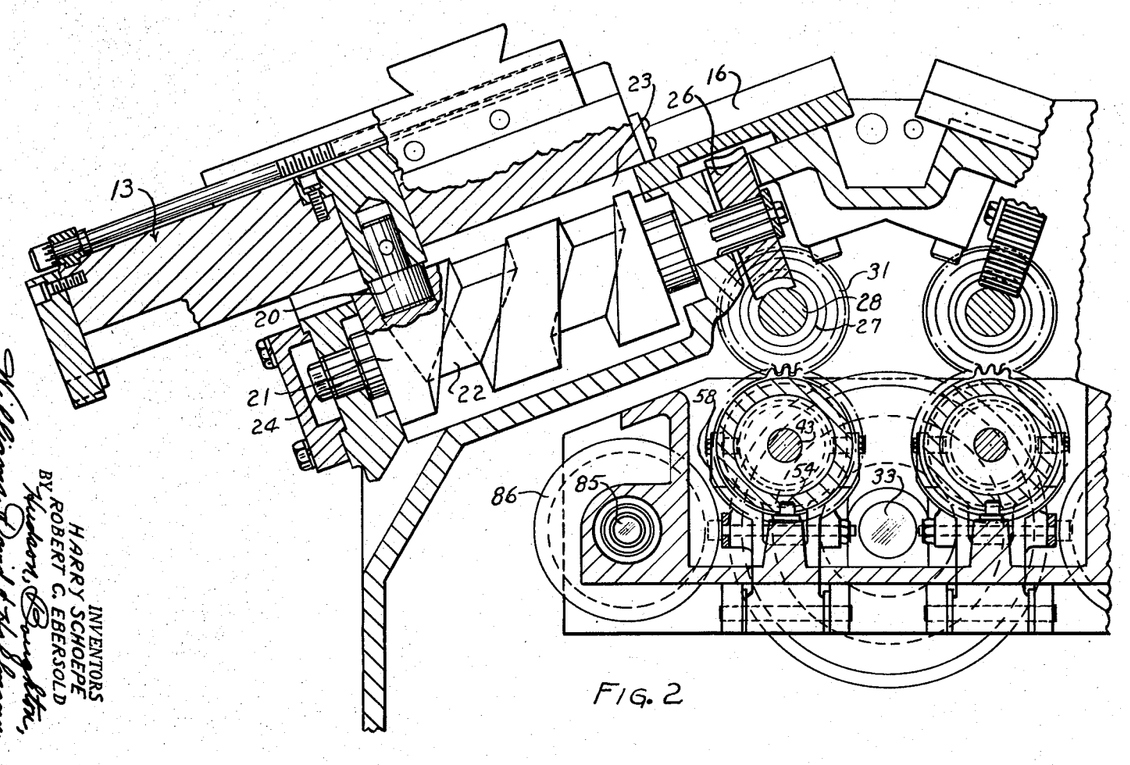
Fig. 2 is a fragmentary vertical sectional view through the cross slide and a portion of the bed of Fig. 1.

As is best shown in Fig. 2, the cross slide 13 is supported for reciprocatory movement on ways 16 on the bed A and includes a cam follower 20 which engages and cooperates with a barrel or drum cam 21. The cam drum 21 is rotatably supported by wall portions of the bed A below the cross slide 13 and the cam follower 20 projects downwardly from the cross slide 13 to engage with a helical cam track 22 of the cam drum 21. Rotation of the cam drum 21 in opposite directions causes movement in opposite directions of the cam follower 20 along the track 22. The cam follower 20 projects through a slot 23 in the supporting member for the cross slide 13, which slot permits the reciprocatory movement of the follower 20 and, in turn, the cross slide 13.

Figure 3:
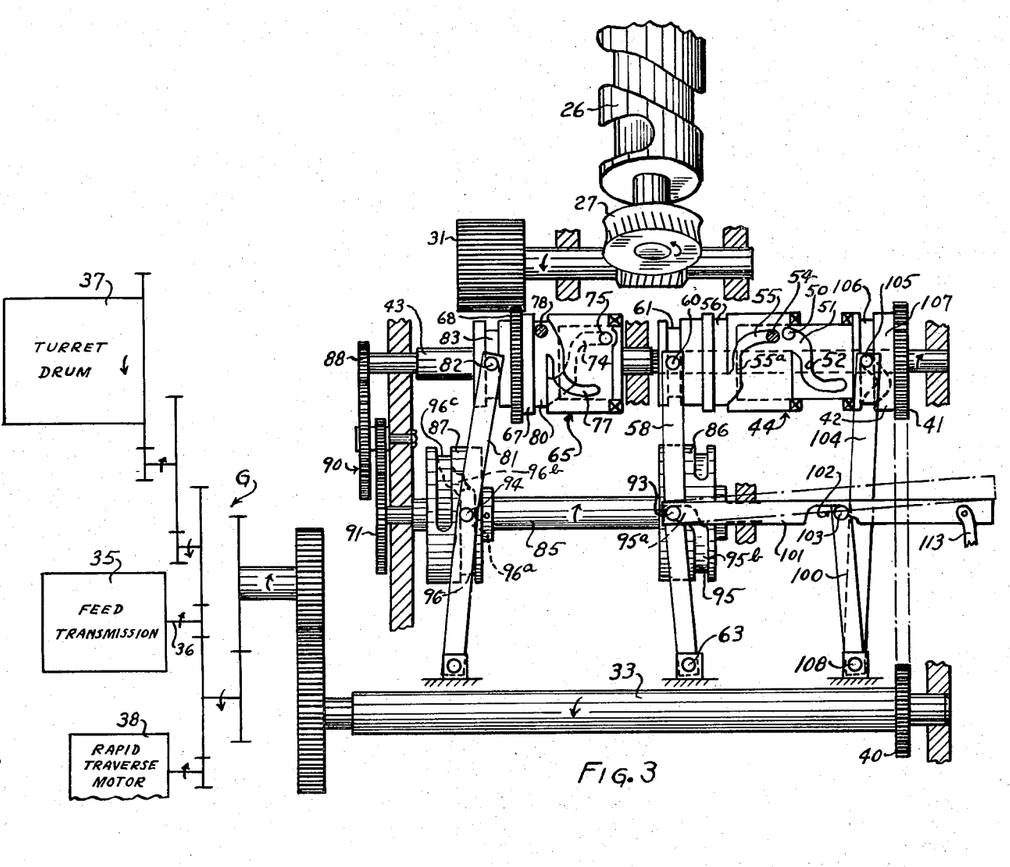
Fig. 3 is a developed view, somewhat diagrammatic, of the drive to one of the cross slides of the machine.

The cam drum 21 is carried by a shaft 24 rotatably supported by the bed A with the axis of the shaft extending generally transversely of the machine. The inner end of the shaft 24 has a worm wheel 26 fixed thereto for rotation therewith and the form wheel 26 is continuously in mesh with a worm gear 27 formed on a shaft 28 rotatably supported by wall members 30 of the bed A. The shaft 28 extends axially of the spindle 10 and has a gear 31 keyed to the end thereof closest to the headstock B. As is indicated diagrammatically in Fig. 3, the gear 31 is selectively driven from a power shaft 33 extending parallel to the axis of the spindle 10, which power shaft is driven through a feed transmission 35. The feed transmission 35, shown schematically in Fig. 3, is driven from the spindle 10 and may be the same as the feed transmission described in detail in the aforesaid patent. The feed transmission has an output shaft 36 which corresponds to the shaft 157 in the aforesaid patent and which is geared, through a gear train G, to drive the shaft 33 as well as a drum 37 for actuating the carrier 11. Rapid traverse movement of the carrier 11 as well as the cross slide 13 is obtained by operating a rapid traverse motor 38 corresponding to the rapid traverse motor 181 of the aforesaid patent. The rapid traverse motor 38 is connected to drive the gear train G, when rapid traverse operation is desired, as explained in detail in the aforesaid patent. For a complete disclosure and explanation of the manner in which the power shaft 33 is rotated in either direction at feed or rapid traverse rates in timed relation to the operation of the machine and the movement of the carrier 11, reference is made to the aforesaid patent. It is to be understood that the particular manner in which the shaft 33 is rotated does not, per se, form a part of the present invention and any conventional means may be utilized to drive the power shaft 33 and suffice it to say that the directions of rotation of the shaft 33 and the carrier cam drum 37 and their rates of rotation, and, in turn, the directions and rates of movement of the carrier 11 and cross slide 31 depend on the direction and rate of rotation of the rapid traverse motor or of the output shaft of the feed transmission 35.

The power shaft 33 is connected to rotate the gear 31 and, in turn, to reciprocate the cross slide 13 through mechanism which comprises a gear 40 fixed to the power shaft 33 so as to be rotatable therewith and a gear 41 in mesh with the gear 40 and formed on a clutch member 42 freely rotatable on a drive shaft 43. The drive shaft 43 extends axially of the spindle 10 parallel to the power shaft 33 and is rotatable from the power shaft 33 through the gears 40, 41 by the engagement of a clutch mechanism 44 of which the clutch member 42 constitutes one of the members of the clutch. The clutch mechanism 44 also includes a clutch member 45 which is splined to the drive shaft 43 adjacent the left-hand side of the clutch member 42, as the latter is viewed in Fig. 4, and is shiftable axially along the drive shaft 43 to engage clutch teeth 46 formed on the clutch member 42 with clutch teeth 47 on the clutch member 45. The end portion 48 of the clutch member 45 adjacent the clutch member 42 is of cylindrical configuration and is hollow to permit the clutch member 45 to telescope over the clutch member 42. The clutch teeth 47 are formed on the end of the end portion 48 while the clutch teeth 46 of the clutch member 42 are formed inwardly of the adjacent end of the clutch member 42 so that the teeth 46, 47 engage when the clutch member 45 is telescoped over the clutch member 42.

The cylindrical end portion 48 of the clutch member 45 supports a cam follower 50 which extends radially inwardly thereof and which, when the clutch mechanism 44 is disengaged, is positioned immediately outwardly of the adjacent end of the clutch member 42 but adjacent the entrance or mouth portion 51 of a cam track 52 formed on the clutch member 42 and adapted to cooperate with the follower 50 to cause the clutch member 45 to move into engagement with the clutch member 42 once the cam follower 50 enters the entrance portion 51 of the cam track 52 and the driving member 42 is rotated in a clockwise direction as viewed from the righthand end thereof in Fig. 3.

Rotation of the cam member 45 by the cam member 42 when the cam follower 50 enters the cam track 52 is controlled by a cam pin 54 which engages a cam track 55 formed in the periphery of the driven clutch member 45. The cam follower or pin 54 is supported by the frame and the cam track 55 is such that the cam member 45 cannot rotate until it has moved axially to permit the pin 54 to travel along a circumferentially extending portion 55a of the track 55. The pin 54 enters the portion 55a when the clutch member 45 is shifted sufficiently to engage cam follower 50 with the track 52. The track 55 opens, at its lefthand end, as viewed in Fig. 3, into a circumferential groove 56 in which the cam follower 54 rides while the clutch member 45 is engaged with the clutch member 42.

Figure 4:
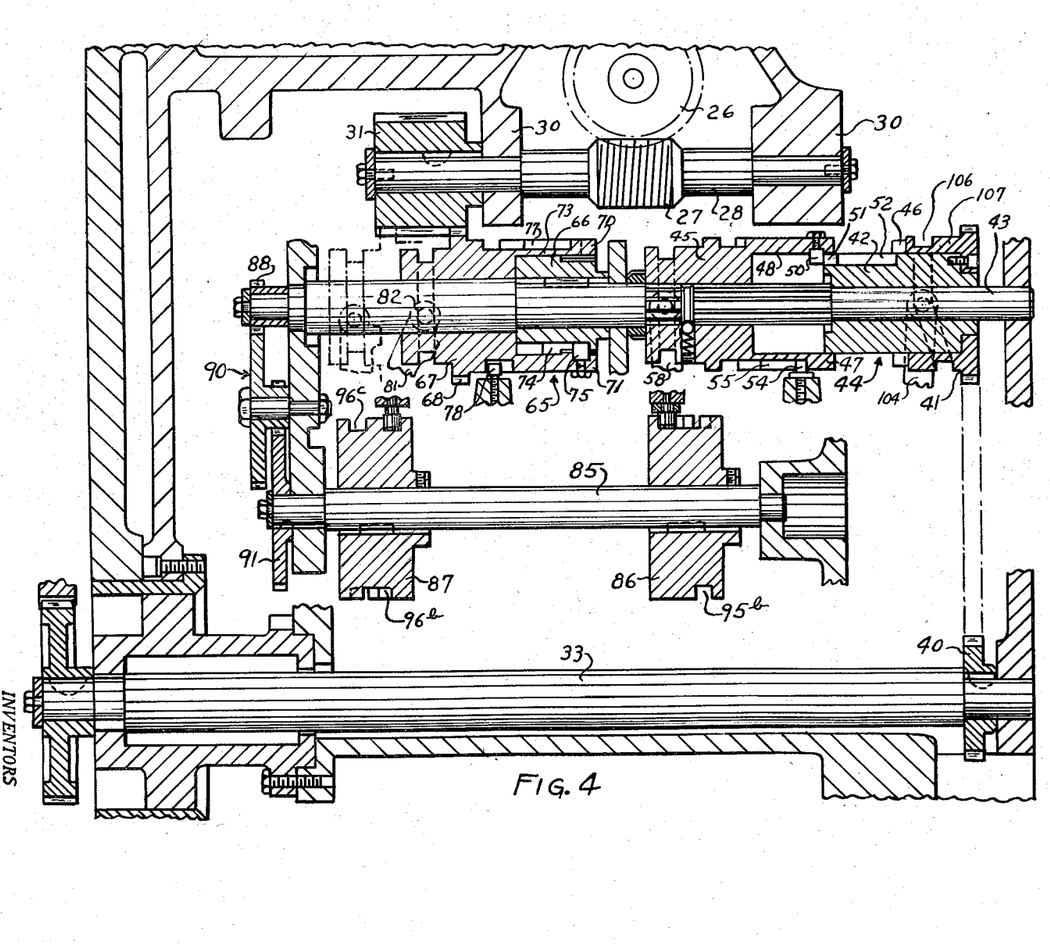
Fig. 4 is a developed view of the drive for one of the cross slides with the parts thereof shown in section.

To effect engagement of the clutch mechanism 44 it is necessary that the driven clutch member 45 be shifted to the right, as viewed in Fig. 4, sufficiently to effect the entry of the cam follower 50 into the mouth portion 51 of the cam track 52. This is done in the illustrated embodiment by means of a yoke member 58 having rollers 60 that ride in a peripheral groove 61 in the periphery of the driven clutch member 45 at the lefthand end of the clutch member, as the latter is viewed in Figs. 3 and 4. The end of the yoke member 58 remote from the rollers 60 is pivoted to the frame of the machine by a pivotal connection 63.

The construction of the clutch mechanism 44 has not been described in detail since it is the same as that shown and described in U.S. Patent No. 2,424,153 and suffice it to say that the clutch mechanism assures that the clutch will always engage, without slipping, at the proper point in the operation of the machine tool cycle and reference is hereby made to Patent No. 2,424,153 for the details of operation and construction not herein shown or described and not believed necessary to an understanding of the present invention.

The drive shaft 43 is rotated on engagement of the clutch mechanism 44 and drives the gear 31 and, in turn, the cross slide through a clutch mechanism 65 including a clutch member 66 fixed to the shaft 43 so as to be driven thereby and a clutch member 67 freely rotatable on the shaft 43 and having a gear 68 formed on the periphery thereof which is in mesh with the gear 31. The clutch member 67 is axially shiftable along the shaft 43 to effect engagement of clutch teeth 70 thereon with clutch teeth 71 formed on the periphery of the clutch member 66. The clutch mechanism 65 is of the same construction as the clutch mechanism 44 and the end portion 73 of the shiftable clutch member 67 is hollow and adapted to telescope over the adjacent end portion of the clutch member 66 to effect engagement of the clutch teeth 70, 71. The clutch member 66 is formed with a cam track 74 which cooperates with a cam follower 75 carried by the tubular portion 73 on the shiftable clutch member 67 to effect engagement of the clutch upon rotation of the clutch member 66 after the cam follower 75 enters the cam track 74. The clutch member 67 is also provided with a cam track 77 which cooperates with a cam pin 78 in the same manner as the cam track 55 cooperates with the cam pin 54 to control rotation of the clutch member 67. The clutch member 67 is also provided with a peripheral groove 80 in which the cam follower 78 rides when the clutch 65 is engaged. The clutch member 67 is shiftable to effect the entrance of the cam follower 75 into the cam track 74 by a yoke member 81 having rollers 82 that ride in a peripheral groove 83 in the clutch member 67. The yoke member 81 is pivoted to the frame at the end thereof remote from the rollers 82.

In accordance with the present invention the drive shaft 43 is geared to drive a control shaft 85 having cam drums 86, 87 thereon for effecting movement of the yoke members 58, 81 respectively to shift the clutch members 45, 67 of the clutches 44, 65. As is shown in Figs. 3 and 4, the left-hand end of the shaft 43 has a gear 88 fixed thereto which drives a gear train 90 including a gear 91 fixed to the left-hand end of the shaft 85 to rotate the latter in timed relationship to the drive shaft 43. The cam drums 86, 87 are fixed to the control shaft 85 for rotation therewith and the yoke members 58, 81 respectively mount cam followers 93, 94 which operate in cam tracks 95, 96 on the cam drums 86, 87, respectively. The cam followers 93, 94 are supported intermediate the ends of the members 58, 81.

The yoke member 58 is initially rocked about its pivotal connection 63 to cause axial movement of the clutch member 45 to initiate the engagement of the clutch mechanism 44 by an oscillating lever 100 and a shift bar 101. The shift bar 101 is pivotally connected to the yoke member 58 adjacent the follower 93 and extends generally axially of the control shaft 85. Endwise movement of the bar 101 causes the yoke member 58 to rock about its pivotal connection. The shift bar 101 has a notch 102 therein which receives a pin 103 carried by the oscillating lever 100 and which cooperates with the notch 102 to shift the bar 101.

The lever 100 is, during the operation of the feed transmission 35 or the rapid traverse motor 38 continuously oscillated. The lever 100 is connected to an arm 104 having a cam follower 105 on the upper end thereof, as the arm is viewed in the drawings, which cooperates with a cam track 106 formed on a hub portion 107 of the gear 41. The lower end of the arm 104 is fixedly connected to a rock shaft 108 rotatably supported by the bed of the machine and rocked by the rocking movement of arm 104. The lower end of lever 100 is also connected to the rock shaft 108 for oscillation therewith, and the cam track 106 is shaped so that the arm 104 and the lever 100 are oscillated or rocked through an arc once during each revolution of the gear 41 and the hub 107.

When the clutch mechanism 44 is disengaged the cam follower 93 of the yoke member 58 is positioned adjacent the left-hand end of a cross portion 95a at the start of the cam track 95, as the cam drum 86 is viewed in Fig. 3, which cross portion permits the bar 101 and, in turn, the yoke member 58 to be shifted to the right by the lever 100. A shifting of the yoke member 58 to the right, a distance equal approximately to the throw of the lever 100 causes the cam follower 50 carried by the slidable clutch member 45 to enter the mouth portion 51 of the cam track formed on the clutch member 42. The cam follower 50, the cam track 52, the pin 54, and the cam track 55 then function to start the rotation of the shaft 43 by the gear 41 and to complete the engagement of the clutch mechanism 44. The rotation of the shaft 43 causes the rotation of the shaft 85 and as the clutch mechanism 44 moves into engagement the cam follower 93 on the yoke member 58 will move into a circumferentially extending cam portion 95b of the cam track 95 which locks the clutch mechanism 44 in engaged position and the bar 101 will move to its extreme right-hand position as the latter is viewed in Fig. 3.

It will be remembered that the gear 41 and, in turn, the cam track 106 are rotated continuously from the power shaft 33 and, therefore, the lever 100 is continuously oscillated. To control the engagement of the clutch mechanism 44 the shift bar 101 is pivotally connected to the lever 58 as heretofore mentioned and is rockable about its pivot to control the relationship of the notch 102 and the pin 103. It will be noted that the outer end of the right-hand wall 109 of the notch 102 in the shift bar 101, the lower end of the notch as the latter is viewed in Fig. 3, is cut away to provide an inner notch portion 102a and an outer notch portion 102b which is of greater length than the inner notch portion and to provide a right-hand wall having offset portions 109a, and 109b. The outer notch portion 102b will permit oscillation of the lever 100 when the clutch mechanism 44 is disengaged without the pin 103 engaging the end walls thereof.

Figure 7:
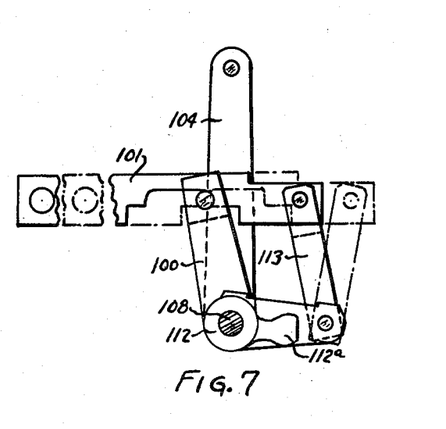

When the lever 100 is in its extreme left-hand position as shown in Fig. 3, the bar 101 is movable downwardly about its pivot to receive the pin 103 in the inner notch portion 102a with the pin disposed adjacent the right-hand wall 104a. Upon oscillation of the lever 100 to its right-hand position shown in Fig. 7, the shift bar 101 will move lengthwise with the lever 100 to move the yoke member 58 sufficiently to position the cam follower 50 on the clutch member 45 in the mouth of the cam track 52. The cam track 52 then functions in the manner described above to complete the engagement of the clutch mechanism and to shift the yoke member 58 so that the follower thereon enters the circumferentially-extending cam portion 95b of the cam drum 86 to effectively lock the clutch mechanism in an engaged position. When the clutch mechanism 44 is engaged, the bar 101 is positioned axially in its extreme right-hand position shown in dot-dash lines in Fig. 7 so that the pin 103 can oscillate within the notch portion 102a without imparting movement to the shift bar 101.

When the clutch mechanism 44 is disengaged, the yoke member 58 and the shift bar are in their extreme left-hand positions wherein the oscillating pin 103, if positioned in the notch portion 102a, would cause the shifting of the bar 101 to engage the clutch mechanism 44. The shift bar 101 is positionable about its pivot so that the pin 103 will oscillate in the outer notch portion 102b and not engage the end walls 109a, 109b.

Figure 5:
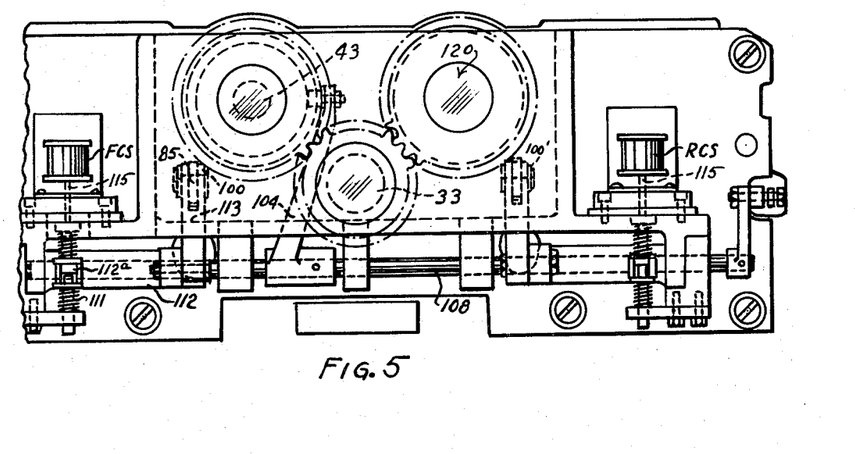
Fig. 5 is an end elevational view through the drive to the cross slides and similar to Fig. 3.
Figure 6:
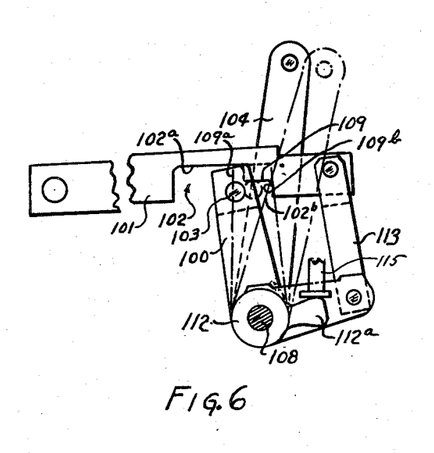
Figs. 6 and 7 are fragmentary views showing different positions of the control mechanism for one of the clutches of the cross slide drives.

The shift bar 101 is urged to a neutral position where the pin 103 may oscillate freely in the notch portion 102b by a spring 111 interposed between the frame of the machine and a rocker member 112 supported, in the illustrated embodiment, on the rock shaft 108 for rotation relative thereto. The rocker member 112 is connected to the shift bar 101 by a link 113 pivotally connected to the bar and to the rocker member. The shift bar 101 is moved to a position where the pin 103 will enter the notch portion 102a to effect shifting of the shift bar 101 by the energization of a solenoid FCS having an armature 115 which effects movement of the rocker member 112 and, in turn, the bar 101 against the action of the spring 111 to position the notch 102a into receiving relationship with the pin 103 upon energization of the solenoid. The spring 111 and the solenoid FCS act on an arm 112a of the rocker member 112 as shown in Fig. 5.

After the clutch mechanism 44 is engaged, the disengagement thereof is controlled by the cam track 95 on the cam drum 86. The cam portion 95b of the cam track 95 lies in a radial plane and terminates, in the illustrated embodiment, so that the shaft 85 cannot rotate a full revolution. The cam follower 93 on the yoke member 58 will remain engaged with the cam portion 95b after entering the latter until the direction of rotation of the shaft 85 is reversed and the cam drum 86 rotated until the follower 93 again enters the cross portion 95a and is moved by the latter to effect disengagement of the clutch mechanism 44. The disengagement of the clutch mechanism 44 stops the rotation of the shaft 43 and the shaft 85 in addition to stopping the movement of the cross slide 13.

It will be noted that solenoid FCS must be deenergized before time to disengage the clutch or the oscillating pin will effect re-engagement of the clutch mechanism.

The clutch mechanism 65 is normally engaged and, therefore, the rotation of the shaft 43 is normally imparted to the gear 31 through the clutch mechanism 65 and the gear 68. The cam drum 87 maintains the clutch mechanism 65 in engagement for a predetermined angular rotation of the shaft 85 from its initial position. To this end the cam track 96 is formed with a circumferentially-extending portion 96a. The circumferential portion 96a extends approximately 180° about the circumference of the cam drum 87 and terminates in a cross portion 96b which joins the circumferentially-extending portion 96a with a second circumferentially-extending portion 96c axially displaced from the first-mentioned portion. When the cam follower 94 of the yoke member 81 enters the cross portion 96b and moves therethrough into the portion 96c the yoke member 81 is shifted to the left, in the illustrated embodiment, to disengage the clutch mechanism 65. The clutch mechanism 65 is re-engaged by reversing the rotation of the shaft 85 to cause the cam follower 94 to move out of the portion 96c through the cross portion 96b and into the portion 96a of the cam track 96. It can now be seen that for the first portion of the angular rotation of the shaft 85 from its normal, inactive position, the clutch mechanism 65 is engaged and that after the shaft 85 has been rotated a predetermined angular amount from its initial position the cam follower 94 of the yoke member 81 enters a portion of the cam track which causes the disengagement of the clutch mechanism and locks the clutch mechanism in a disengaged position for continued rotation of the shaft 85 and maintains the clutch in an engaged position until the rotation of the shaft 85 is reversed.

In the type of machine disclosed, the movements of the cross slides are timed in reference to the movement of the carrier 11 which is actuated by the carrier cam drum 37 and the time of initiation of the cross slide movement relative to the movement of the carrier will depend upon the type of operation being performed. In some cases it is desirable to initiate the cross slide movement early or at the beginning of the movement of the carrier 11. Other times it is desirable to initiate the movement of the cross slide somewhat later and at still other times the movement of the cross slide might be initiated after the completion of the carrier movement. The cross slide drive of the present invention enables the movement of the cross slide to be initiated at the proper point in the operation of the machine. In the illustrated machine the gear train 90 and the gearing G are such that the shaft 85 is rotated approximately, but less than, one revolution during the work stroke of the carrier and its dwell periods. The control cam drum 87 is such that the clutch 65 remains engaged for approximately the first half of the work stroke of the carrier and then is disengaged for the last half of the work stroke provided the solenoid FCS is energized at the start of the carrier movement. Therefore, if the movement of the cross slide is not initiated until the carrier is approximately half way through its maximum stroke the cam drum 87 will never be rotated to a position where the clutch mechanism 65 disengages.

When the carrier 11 reaches the end of the stroke the direction of rotation of the power shaft 33 and, in turn, the drive shaft 43 and the control shaft 85 are reversed to return the carrier 11 and the cross slide to their initial positions, and to return the clutches to their normal positions in which the clutch mechanism 44 is disengaged and the clutch mechanism 65 engaged.

In the illustrated machine a drive 120 to the cross slide 14 is of substantially the same construction as the drive to the cross slide 13 and, therefore, is not shown or described in detail. The oscillating lever 100', however, of the drive 126 for the cross slide 14, which corresponds to the lever 100, is fixed to the rock shaft 108 which is rocked by the arm 104. The drive 120, therefore, does not include a cam track and cam follower corresponding to the cam track 106 and the cam follower 105 of the drive for the cross slide 13 and the lever 100' does not have a portion corresponding to the arm 104 of lever 100. The cross slide 14 is actuated upon energization of a solenoid RCS shown schematically in Fig. 5 and which corresponds to the solenoid FCS of the drive for the cross slide 13.

Figure 8:
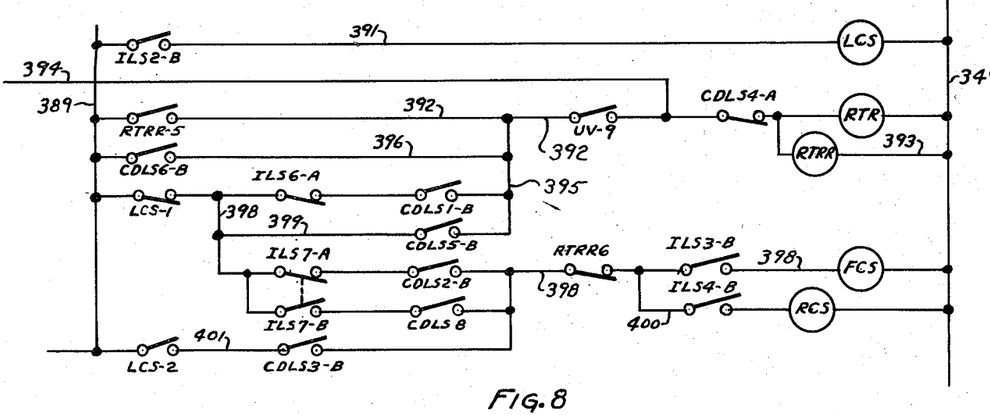
Fig. 8 is a fragmentary electric circuit diagram showing the control for operating the cross slides of the machine shown in Fig. 1.

The control circuit for the machine may be the same as that shown and described in detail in Patent 2,644,222 with certain switches and contacts added to permit the operation of the cross slides 13, 14, at an earlier point relative to the movement of the carrier 11 than is possible with the circuit of the patent. The portion of the control circuit shown in Patent 2,644,222 for controlling the operation of the cross slides is shown in Fig. 5 with the addition of switch ILS7 and switch CDLS8. As described above, the movements of the cross slides 13, 14 are initiated by energization of the solenoids FCS, RCS. During the operation of the machine, wire 389 shown in Fig. 8 is connected to L1 through circuitry not necessary for an understanding of the present invention but set out and described in detail in Patent 2,644,222. The wire 389 has been designated with the same reference numeral as the corresponding wire in Patent 2,644,222 and the other portions of the circuit of Fig. 8 have been given the same reference numerals in the following description as the corresponding portions of the circuit shown in the designated patent. Referring to Fig. 8, the switch ILS7 has a set of normally closed contacts ILS7–A and a set of normally open contacts ILS7–B. The normal condition of switch ILS7 is such that the contacts ILS7–A are closed and the contacts ILS7–B open. The contacts ILS7–A condition a circuit for energizing the cross slide solenoids FCS and RCS on the closing of contacts ILS3–B and contacts ILS4–B respectively. The circuit for energizing the solenoids FCS and RCS may be traced from wire 389 through normally closed contacts LCS1 of a late cross slide relay LCS, connection 398, which includes contacts ILS7–A, contacts CDLS2–B, normally closed contacts RTRR–6 of relay RTRR, and contacts ILS3–B. The contacts ILS3–B are the contacts of a switch, not shown, which is actuated to preselect the front cross slide 13 prior to the initiation of the particular operation and the contacts CDLS2–B are the contacts of a limit switch which is closed in timed relation to the movement of the carrier 11 and is preferably actuated at approximately the midpoint of the work stroke of carrier 11. The late cross slide solenoid RCS and the contacts ILS4–B connected in series therewith are in a series connection 400 connected in parallel with the contacts ILS3–B and the front cross slide solenoid FCS and the solenoid RCS is energized upon the closing of contacts CDLS2–B if the preselector switch contacts ILS7–A and ILS4–B are closed.

If the cross slides are to be actuated in an earlier movement than that initiated by the closing of the contacts CDLS2–B, for example, at the beginning of the carrier work stroke, the switch ILS7 is operated to open its contacts ILS7–A and close its contacts ILS7–B. The closing of the contacts ILS7–B of the switch ILS7 conditions the cross slide solenoids FCS and RCS for energization upon the closing of switch contacts CDLS8. The contacts CDLS8 are the contacts of the limit switch which is actuated early in the work stroke of the carrier 11. The contacts CDLS8 and the contacts ILS7–B are connected in series with each other and in parallel with the contacts ILS7–A and contacts CDLS2–B and, therefore, function when closed to complete a circuit for energizing the solenoid FCS or the solenoid RCS or both as described in conjunction with the operation of the switch having contacts CDLS2–B. It will be noted that the contacts CDLS8 are ineffective when the switch ILS7 is in its position conditioning the solenoids FCS, RCS for energization by the operation of contacts CDLS2–B by reason of the opening of contacts ILS7–B.

When the cross slide solenoids RCS, FCS are to be energized at the end of the carrier stroke, a late cross slide relay LCS is energized by the closing of switch contacts ILS2–B to complete a circuit for energizing a relay LCS from the wire 389. The energization of the relay LCS opens its contacts LCS1 breaking the circuit to connection 398 and rendering the contacts CDLS2–B and CDLS8 ineffective to energize the solenoids FCS, RCS. The energization of the relay LCS also closes its contacts LCS2 for completing a connection 401 from wire 389 to the connection 398 at a point intermediate the contacts CDLS2–B and the contacts RTRR6. The connection 401 includes late cross slide relay contacts LCS2 and switch contacts CDLS3–B of a late cross slide limit switch connected in series. The limit switch having contacts CDLS3–B is actuated at the end of the carrier work stroke and completes a circuit upon actuation from the wire 389 through the contacts LCS2, contact CDLS3–B, contacts RTRR6 to energize either the solenoid FCS or the solenoid RCS or both depending upon the condition of contacts ILS3–B and contacts ILS4–B of the cross slide preselector switches.

The direction of the main drive and, in turn, the movement of the carrier 11 and the cross slides 13, 14 are reversed at the end of the carrier work stroke by the operation of a switch having normally open contacts CDLS1–B, the closing of which normally completes a circuit for energizing rapid traverse relay RTR and rapid traverse reverse relay RTRR. When the relays RTR and RTRR are energized, the rapid traverse motor 38 operates to drive the shaft 33 and the carrier drum 37 in a reverse direction. Any suitable control circuit may be used for reversing the rapid traverse motor in response to the energization of the relays RTR and RTRR and the circuit may be the same as that shown in Patent No. 2,644,222.

The circuit for energizing the relays RTR and RTRR upon the completion of the carrier work stroke may be traced from wire 389 through the normally closed contact LCS1 of the late cross slide relay, normally closed contacts ILS6–A of a preselector switch, contacts CDLS1–B, a connection 395 and a connection 392 to the relays RTR, RTRR and including normally open relay contacts UV9 and normally closed contacts CDLS4–A. The normally open contacts UV9 are contacts of an under voltage relay described in detail in the aforesaid patent and are closed during the automatic operation of the machine. The contacts CDLS4–A are contacts of a limit switch which is actuated to disengage the rapid traverse motor and to energize the indexing motor, not shown but described in detail in the designated patent, upon the return of the carrier 11 to its start position.

As set out above, if the cross slides or one of the cross slides is to be operated after the carrier work stroke, the relay LCS is energized at the beginning of the operation by the closing of contacts ILS2–B of a preselector switch. The energization of the late cross slide relay LCS opens its contacts LCS1 to render the contacts CDLS1–B which are closed at the end of the carrier stroke ineffective to energize the rapid traverse relay and the rapid traverse reverse relay. The main drive and, in turn, the carrier 11 and the cross slides 13, 14 are reversed in late cross slide operation by the closing of a limit switch having normally open contacts CDLS6–B. The contacts CDLS6–B are connected in parallel with the series connection including the contacts LCS1, contacts ILS6–A and contacts CDLS1–B. From the circuit it can be seen that closing of the contacts CDLS6–B completes a circuit from the wire 389 to the connection 392 through the connection 395 to energize the rapid traverse relay RTR and the rapid traverse reverse relay RTRR. The limit switch having contacts CDLS6–B is actuated after the cross slides have completed their desired movement in late cross slide operation.

In some operations it is desirable to provide a dwell at the end of the carrier work stroke which is independent of the dwell necessary for late cross slide operation and which is generally of a shorter duration. To this end, the wire 395 which is connected between the wire 398 and the connection 392 includes the contacts CDLS5–B of a limit switch actuated a predetermined time after the termination of the carrier work stroke. It will be remembered that the circuit for energizing the rapid traverse relay and the rapid traverse relay at the end of the carrier work stroke include normally closed contacts ILS6–A of a preselector switch. To render the switch having contacts CDLS5–B effective, the switch having contacts ILS6–A is operated to a position at the start of the operation which opens the contacts ILS6–A thereby preventing initiation of the return movement upon closing of the contacts CDLS1–B at the end of the carrier work stroke.

Figure 9:
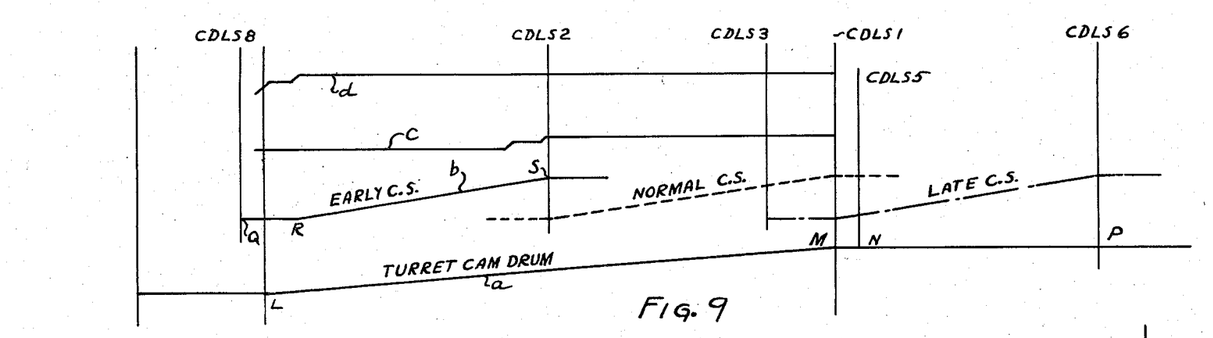
Fig. 9 is a diagram showing the relationship of the movement of one of the cross slides to the movement of the carrier.

Fig. 9 is a diagram showing the timing relationship of the cams and the operation of the cross slide 13 with reference to the movement of the carrier 11. In Fig. 9 curve *a* is a diagram of the movement of the carrier 11 and the inclined portion thereof indicates the time during the revolution of the turret drum cam that the carrier 11 is moved. Point L on the curve indicates the beginning of the movement of carrier 11 and line LM indicates the feed movement of the carrier 11. Point M on curve is that point at which the limit switch CDLS1 is actuated to terminate the feeding movement of the carrier 11 and to initiate rapid traverse return if no dwell is desired. The line ML represents the rapid return movement of the carrier 11 and after point L is reached a limit switch, designated in the aforesaid patent by the reference character CDLS4, is actuated to terminate the operation of the rapid traverse motor.

The line MN represents the normal adjustable dwell after the termination of the feeding movement wherein return movement is initiated by actuating limit switch CDLS5 while line MP represents the dwell in late operation where the limit switch CDLS6 initiates the return movement of the carrier 11.

Curve *b* illustrates the movement of the cross slide when the latter is initiated in early cross slide operation. As is shown from the relationship of curve *b* and curve *a* the limit switch CDLS8 is actuated at point Q, which in time is before the movement of the carrier 11, to engage the clutch mechanism for operating the cross slide and the cross slide movement starts at point R immediately thereafter upon engagement of the clutch mechanism 44 and the movement of the carrier 11 has started. The rotation of the control shaft 85 starts immediately after the actuation of the switch CDLS8 to rotate the control cams 86, 87 to engage the clutch mechanism 44 and to control the operation of clutch mechanism 65. A developed diagram of the cam 87 is indicated by curve *c* and it can be seen therefrom that the control cam 87 operates to maintain the clutch mechanism 65 engaged for approximately ½ of the work stroke movement of the carrier 11. At approximately the mid-point of the work stroke of the carrier 11 and at point S on the diagram *b*, the cam 87, as shown by the diagram *c*, operates to disengage the clutch mechanism 65 by moving the yoke member 81 to provide a dwell in the operation of the cross slide until after the drive to the carrier is reversed to return the carrier. When the drive is reversed, the direction of rotation of the drive shaft 43 and of the control cams 86, 87 is reversed and the clutch mechanism 65 will be re-engaged upon reverse rotation of the cam 87 to a point corresponding to point S and when the cross slide is returned the cam 86 will operate to disengage clutch mechanism 44 to stop the drive through the clutch mechanism 65 to the cross slide. Diagram *d* is a developed diagram of the control cam 86 and it can be seen therefrom that it operates to immediately lock the clutch mechanism 44 in an engaged position upon rotation from its initial position and then to disengage the mechanism when rotated in a reverse direction to return it to its initial position. If the cross slide operation is initiated in a later part of the work stroke of the turret drum cam the curves *b* and *c* will be shifted to the right with respect to the curve *a* and the timing of the cross slide operation with respect to the carrier 11 is shown for normal and late cross slide operation when the movement of the cross slide is initiated by the closing of switch contacts CDLS2–B or CDLS3–B.

The particular manner of operating the limit switches having contacts CDLS1–B, CDLS2–B, CDLS3–B and CDLS8, and the preselector switches having contacts ILS3–B, ILS4–B, ILS6–A and the preselector switch ILS7 does not, per se, form a part of the present invention. The switches, however, may be actuated by dogs carried on a control drum which is moved axially as the carrier 11 is fed axially while the preselector switches may be actuated by dogs carried on the faces of a member having the same configuration as the carrier 11 and indexed with the carrier 11 as described in the aforesaid patent. Reference is hereby made to the aforesaid Patent 2,644,222 for a complete disclosure and description of a method of operating the limit switches and the preselector switches.

From the foregoing description it can be seen that a cross slide drive constructed in accordance with the present invention is a compact drive since a dwell period can be provided by disengaging the clutch mechanism 65 rather than by providing a cam having a dwell portion thereon as has been the conventional practice. In addition, the drive is capable of transmitting heavy loads, particularly once the clutches 44, 65 are engaged. It will be noted that in the operation of the machine, the cross slides 13, 14 will not normally be under heavy load when the clutch mechanisms 44, 44′ are being engaged. In addition to providing a compact mechanism it is possible to obtain a long dwell after the cross slides have been operated which, in turn, makes it possible to initiate the movement of the cross slide at the beginning of the carrier stroke.

While the preferred embodiment of the present invention has been disclosed and described in detail, it is to be understood that it is my intention to cover all modifications, constructions, and arrangements which fall within the ability of those skilled in the art and within the scope and spirit of the present invention.

Having thus described our invention, what we claim is:

1. In a machine tool having an element to be advanced from an initial position and returned, a drive for advancing and returning said element comprising a drive member rotatable in one direction and reversed after a predetermined angular rotation and rotated in a direction opposite to said one direction, means connecting said drive member to drive said element to advance and return said element respectively upon rotation of said shaft in its said one and opposite directions respectively, and clutch means for connecting and disconnecting said drive to and from said member and including a clutch actuating member movable in a first direction to a clutch-engaged position wherein said drive member is effective to drive said element and in a second direction to a disengaged position wherein said drive is ineffective to drive said element, a control member, means for rotating said control member in timed relation to said drive member and in a direction dependent upon the direction of rotation of said drive member, and operating means cooperating with said control member and operatively connected to said actuating member to actuate the latter in its said first and second directions respectively to its said positions upon movement in respective directions opposite to each other, said control member comprising means for actuating said operating means in one direction only upon rotation of said control member in one direction and in the opposite direction only upon rotation in the opposite direction.

2. In a machine tool having an element to be advanced from an initial position and returned, a drive for advancing and returning said element comprising a drive member rotatable in one direction and reversed after a predetermined angular rotation and rotated in a direction opposite to said one direction, means connecting said drive member to drive said element to advance and return said element respectively upon rotation of said shaft in its said one and opposite directions respectively, and clutch means for connecting and disconnecting said drive to and from said member and including a clutch actuating member movable in a first direction to a clutch-engaged position wherein said drive member is effective to drive said element and in a second direction to a disengaged position wherein said drive is ineffective to drive said element, a control member, means for rotating said control member in timed relation to said drive member and in a direction dependent upon the direction of rotation of said drive member, and operating means cooperating with said control member and operatively connected to said actuating member to actuate the latter in respective opposite directions to its said positions upon rotation of said control member in opposite directions, said control member comprising cam means for actuating said operating means in one direction only upon rotation of said control member in one direction and in the opposite direction only upon rotation in the opposite direction.

3. In a machine tool, a machine tool element, a reversible drive for reciprocating said machine tool element from and to an initial position, said drive being operated in one direction to move the element from its initial position and in the opposite direction to return the element to its initial position and comprising a power-actuated drive member, a clutch mechanism connecting said drive member to drive said machine tool element and actuatable to disconnect said drive member and drive from said element, a control cam having an initial position corresponding to the initial position of said element and rotated in timed relation to said drive member and in a direction dependent on the direction of operation of said drive, and clutch actuating means operatively connected to said clutch mechanism and operable in opposite directions by said control cam between clutch-engaged and clutch and drive disengaged positions, said cam having a cam portion for effecting operation of said clutch actuating means in one direction only upon rotation in one direction to disengage said clutch means and drive upon rotation of said control cam in its said one direction through a predetermined angular position and to effect operation of said actuating means only in a direction opposite to said one direction upon rotation of said control cam in a direction opposite to its said one direction to re-engage said clutch mechanism upon rotation of said control cam through said predetermined angular position in the reverse direction.

4. In a machine tool, a machine tool element, a drive for reciprocating said machine tool element from and to an initial position, said drive being operated in one direction to move the element from its initial position and in the opposite direction to return the element to its initial position and comprising a power-actuated drive member, clutch mechanism connecting said drive member to drive said machine tool element and actuatable to disconnect said drive member and drive from said element, a control cam having an initial position corresponding to the initial position of said element and rotated in timed relation to said drive member and in a direction dependent on the direction of operation of said drive, and actuating means for said clutch mechanism operated by said control cam between clutch-engaged and clutch and drive disengaged positions, said cam having a cam portion for effecting disengagement of said clutch mechanism upon rotation of said control cam in one direction through a predetermined angular position and for effecting re-engagement of said clutch mechanism upon rotation of said control cam through said predetermined angular position in the reverse direction and portions on the opposite sides of said cam portion for respectively maintaining said actuating means in clutch-engaged and clutch-disengaged positions.

5. In a machine tool, a drive for moving a machine tool element from an initial position and returning the element to the initial position and being operated in one direction to move the element from its initial position and in the opposite direction to return the element to its initial position and comprising a drive member, a clutch having an output element connected to drive said machine tool element and a movable member actuatable between two positions to respectively connect said drive member in driving relationship with and to disconnect said drive member and drive from said machine tool element, means for actuating said movable member including a cam and cooperating cam follower operatively connected to said movable member, said cam having an initial position corresponding to said initial position of said machine tool element, means for rotating said cam in one direction from said initial position with and in timed relationship to the rotation of said output element upon engagement of said clutch to move said element from said initial position and for rotating said cam in the opposite direction upon reversal of said drive, means for selectively actuating said movable member to engage said clutch to rotate said clutch output element, said cam having a cam track for locking said movable member in a clutch-engaged position when said cam is rotated in said one direction from said initial position and for actuating the movable member to a clutch-disengaged position upon reversal of said cam and the return thereof to its said initial position.

6. In a machine tool, the combination as defined in claim 5 wherein said means for selectively actuating said movable member comprises an oscillating member operatively connected to said drive member for oscillation thereby, a shift bar connected to said cam follower to move the latter relative to said cam to effect engagement of said clutch means, said bar having a first position in which said oscillating member is oscillatable relative thereto and a second position wherein said bar is engaged and shifted by said oscillating member to engage said clutch, and means for selectively actuating said bar between said positions.

7. In a machine tool, a movable machine tool element to be actuated from a machine tool drive in a predetermined manner with respect to the operation of the machine tool drive, a drive shaft, means supporting said drive shaft for rotation independently of said element, first clutch means including a movable member shiftable to engage and disengage the clutch means to selectively connect the drive shaft to be driven by said machine tool drive, second clutch means for selectively connecting the drive shaft to drive said element and including a movable member actuatable to selectively effect engagement and disengagement of the second clutch means, a control shaft, means rotating said control shaft in timed relation to said drive shaft, and control means on said control shaft for effecting actuation of said movable members in timed relationship to the rotation of said control shaft.

8. In a machine tool, a movable machine tool element to be actuated from a machine tool drive in a predetermined manner with respect to the operation of the machine tool drive, a drive shaft, means supporting said drive shaft for rotation independently of said element, first clutch means including a movable member shiftable to engage and disengage the clutch means to selectively connect the drive shaft to be driven by said machine tool drive, second clutch means for selectively connecting the drive shaft to drive said element and including a movable member actuatable to selectively effect engagement and disengagement of the second clutch means, a control shaft, means rotating said control shaft in timed relation to said drive shaft, and cam means on said control shaft for effecting actuation of said movable members in timed relationship to the rotation of said control shaft.

9. In a machine tool, a machine tool element, a drive for reciprocating said machine tool element from and to an initial position, said drive being operated in one direction to move the element from its initial position and in the opposite direction to return the element to its initial position and comprising a rotatable drive member, clutch mechanism connecting said drive member to drive said machine tool element and actuatable to disconnect the drive from said drive member to said element, a control member rotated in timed relation to the rotation of said drive member and in a direction dependent on the direction of operation of said drive, actuating means for said clutch mechanism having clutch-engaged and clutch disengaged positions, said control member having means thereon for effecting operation of said actuating means to a clutch-disengaged position upon rotation of said control member in one direction through a predetermined angular position and for effecting operation of said clutch actuating means to a clutch-disengaged position upon rotation of said control member through said predetermined angular position in the reverse direction, reversible power actuated means for rotating said drive member in one direction for moving said element from its said initial position and in the opposite direction to return said element to its said initial position including clutch means for selectively connecting said power actuated means to said drive member, means for selectively engaging said clutch means to drive said element from said initial position, and control means for effecting the disengagement of said clutch means upon return of said element to its said initial position.

10. In a machine tool, the combination as defined in claim 9 wherein said control means comprises a control member rotated in timed relation to said drive member and having an initial position corresponding to the initial position of said element and clutch actuating means responsive to the rotation of said control member to said initial position after rotation therefrom for disengaging said clutch means.

11. In a machine tool, the combination as defined in claim 9 wherein said control means comprises a cam rotated in timed relation with said drive member in a direction dependent on the direction of rotation of said drive member and a cooperating cam follower operatively connected to said clutch means and operable to engage and to disengage said clutch means, said cam having a cam surface thereon for moving said cam follower to maintain said clutch means in an engaged condition on rotation of said cam from its said initial position and to disengage said clutch means upon the return of said cam to its said initial position.

12. In a machine tool, the combination as defined in claim 9 wherein said control member is a cam having a cam track thereon for effecting operation of said actuating means for said clutch mechanism.

13. In a machine tool, a movable machine tool element to be actuated from a reversible drive for operating a second machine tool element, a drive member, first clutch means for connecting said drive member to said drive to rotate the latter in timed relationship to the drive, a movable member movable to respectively effect engagement and disengagement of said clutch means, a cam and cooperating cam follower operatively connected to said movable member for actuating said movable member, said cam and cam follower having initial positions in which said clutch means is disengaged and said cam having a cam track for effecting the locking of said actuating member in a clutch-engaged position upon rotation of said cam from its said initial position and for effecting disengagement of said clutch means upon the return of the cam to its said initial position, second clutch means for selectively connecting said drive member to drive said element, a second actuating member for actuating said second clutch means between engaged and disengaged positions, a second cam having an initial position corresponding to the initial position of said machine tool element and rotatable from said initial position to lock said second actuating member in engaged and disengaged positions for a respective predetermined angular rotation from its said initial position, and means for rotating said cams in timed relationship to the rotation of said drive member.

14. In a machine tool, a movable machine tool element to be actuated from a reversible rotary drive for operating a second machine tool element and which drive is reversed after a predetermined angular rotation thereof in one direction, a drive member, first clutch means for connecting said drive member to said drive to rotate the latter in timed relationship to the drive, a movable member movable to respectively effect engagement and disengagement of said clutch means, a cam and cooperating cam follower operatively connected to said movable member for actuating said movable member, said cam and cam follower having initial positions in which said clutch means is disengaged and said cam having a cam track for effecting the locking of said actuating member in a clutch-engaged position upon rotation of said cam from its said initial position for effecting disengagement of said clutch means upon the return of the cam to its said initial position, second clutch means for selectively connecting said drive member to drive said element, a second actuating member for actuating said second clutch means between engaged and disengaged positions, a second cam having an initial position corresponding to the initial position of said machine tool element and rotatable from said initial position to first lock said second actuating member in an engaged position and upon angular rotation through a predetermined angular position to disengage said second clutch means and to effect re-engagement of said second clutch means upon reverse rotation through said predetermined angular position, and means for rotating said cams in timed relationship to the rotation of said drive member and in a direction dependent on the direction of rotation of said drive member.

15. A mechanism for engaging a clutch having a member movable to engage and disengage the clutch, said mechanism comprising a reciprocable operating member, means connecting said operating member to said movable member to reciprocate said movable member upon reciprocation of the operating member and for pivotal movement transversely to the reciprocable movement of the member between first and second positions, an oscillatable member for shifting said operating member to engage said clutch, means for oscillating said oscillatable member, abutment means on said operating member disposed in the path of said oscillating member and engaged thereby to shift said operating member when said operating member is in its said first position and disposed clear of said oscillating member when said operating member is in its said second position, and means for selectively actuating said operating member between said positions.

16. In a drive mechanism for driving an element from and to an initial position to provide an advance, a dwell and return of the element comprising a drive member rotatable in one direction and reversed after a predetermined angular rotation, means connecting said drive member to advance and return said element on rotation in opposite directions respectively comprising a clutch having drive-disengaged and drive-engaged positions respectively, a control cam having an initial position corresponding to said initial position of said element, means rotating said cam in a direction dependent on the direction of rotation of said drive member and in timed relation thereto to drive said cam in one direction from its initial position and return upon rotation of said drive member to advance and return said element, a cam follower cooperating with said cam and connected to actuate said clutch between its positions on movement of said follower between first and second positions, said cam having a cam surface thereon effective for a predetermined angular rotation less than 360° from said initial position to maintain said cam follower in its said first position, a surface engaged by said follower after said predetermined rotation for actuating said follower to its said second position upon continued rotation and a third surface effective to maintain said follower in said second position and extending for a predetermined angular rotation less than 360°, said means connecting said control cam to said drive member having a drive ratio to effect rotation of said drive member an angular amount at least no greater than the angular rotation necessary to cause said follower to traverse said surfaces during the time said drive member is rotated to advance said element and before its reversal of rotation to return said element.

References Cited in the file of this patent

UNITED STATES PATENTS

| | | |
|---|---|---|
| 905,637 | Beskow | Dec. 1, 1908 |
| 2,235,420 | Cory | Mar. 18, 1941 |
| 2,288,254 | Rich | June 30, 1942 |

FOREIGN PATENTS

| | | |
|---|---|---|
| 535,282 | Great Britain | Apr. 3, 1941 |